(12) United States Patent
Saleheen et al.

(10) Patent No.: US 12,502,081 B2
(45) Date of Patent: Dec. 23, 2025

(54) SPECTRO-MECHANICAL IMAGING FOR CHARACTERIZING EMBEDDED LESIONS

(71) Applicant: EDDA TECHNOLOGY, INC, Princeton, NJ (US)

(72) Inventors: Firdous Saleheen, Lawrenceville, NJ (US); Guo-Qing Wei, Plainsboro, NJ (US); Li Fan, Belle Mead, NJ (US); Xiaolan Zeng, Princeton, NJ (US); Jianzhong Qian, Princeton Junction, NJ (US)

(73) Assignee: EDDA TECHNOLOGY, INC, Princeton, NJ (US)

( * ) Notice: Subject to any disclaimer, the term of this patent is extended or adjusted under 35 U.S.C. 154(b) by 330 days.

(21) Appl. No.: 17/542,334

(22) Filed: Dec. 3, 2021

(65) Prior Publication Data

US 2022/0175252 A1 Jun. 9, 2022

Related U.S. Application Data

(60) Provisional application No. 63/121,084, filed on Dec. 3, 2020.

(51) Int. Cl.
*A61B 5/00* (2006.01)
*A61B 5/103* (2006.01)
*A61B 5/107* (2006.01)

(52) U.S. Cl.
CPC .......... *A61B 5/0091* (2013.01); *A61B 5/0053* (2013.01); *A61B 5/0075* (2013.01); *A61B 5/1032* (2013.01); *A61B 5/1079* (2013.01); *A61B 5/7267* (2013.01)

(58) Field of Classification Search
CPC ... A61B 5/0091; A61B 5/0053; A61B 5/0075; A61B 5/1032; A61B 5/1079; A61B 5/7267; A61B 5/0035
See application file for complete search history.

(56) References Cited

U.S. PATENT DOCUMENTS

| | | |
|---|---|---|
| 2009/0118614 A1 | 5/2009 | Sendai |
| 2014/0051975 A1 | 2/2014 | Rapoport et al. |
| 2015/0320385 A1 | 11/2015 | Wright |
| 2017/0078584 A1* | 3/2017 | Won ..................... A61B 5/0053 |
| 2019/0059739 A1 | 2/2019 | Abe |
| 2020/0205665 A1* | 7/2020 | Won ..................... A61B 5/444 |

FOREIGN PATENT DOCUMENTS

| | | |
|---|---|---|
| JP | 2014233532 A | 12/2014 |
| WO | 2020068851 A1 | 4/2020 |

OTHER PUBLICATIONS

International Search Report and Written Opinion mailed Apr. 19, 2022 in International Patent Application PCT/US2021/061897.

(Continued)

*Primary Examiner* — Keith M Raymond
*Assistant Examiner* — Andrew W Begeman
(74) *Attorney, Agent, or Firm* — Venable LLP

(57) ABSTRACT

A method, implemented on a machine having at least one processor, storage, and a communication platform capable of connecting to a network for characterizing a tumor embedded inside a medium, comprising: measuring at least one of a mechanical property and a spectral property of the tumor.

29 Claims, 13 Drawing Sheets

(56) References Cited

OTHER PUBLICATIONS

Extended European Search Report mailed Sep. 25, 2024 in EP Application No. 21901575.
Sahu et al., "Characterization of Mammary Tumors Using Noninvasive Tactile and Hyperspectral Sensors", IEEE Sensors Journal, Oct. 1, 2014, pp. 3337-3344, vol. 14, No. 10, IEEE, USA.

* cited by examiner

SPECTRO-MECHANICAL IMAGING FOR CHARACTERIZING EMBEDDED LESIONS

CROSS-REFERENCE TO RELATED APPLICATIONS

This application claims priority to U.S. provisional application No. 63/121,084, filed Dec. 3, 2020, the contents of which are incorporated herein by reference in its entirety.

BACKGROUND OF THE INVENTION

1. Field of the Invention

The present disclosure relates to a system and method of spectro-mechanical imaging for characterizing a target, specifically a tumor, embedded inside a solid body in a non-invasive way. In particular, the present disclosure is related to methods for estimating size and depth of a tumor based on variances in spectral properties of the tumor. Also, the present disclosure is related to a method of estimating elastic modulus of the target i.e., the tumor.

2. Description of Related Art

Frequent checkup of tumor progression is crucial for breast cancer diagnosis and therapy monitoring. Currently, invasive and non-invasive methods are available for these checkups. An invasive examination poses significant risks to the patient. Also, resources required for the invasive examination are substantial. On the other hand, a non-invasive examination provides an advantageous alternative in terms of risks and resources. Imaging a tumor is one such non-invasive method. Therefore, for breast cancer diagnosis and therapy monitoring, various imaging modalities such as anatomical imaging, quantitative imaging, molecular imaging, and functional imaging have been used.

To quantify the tumor progression, a tumor may be characterized anatomically and physiologically. Characterizing a tumor requires looking into its mechanical and spectral properties. These mechanical and spectral properties change substantially as the tumor is driven to malignancy.

The physiological condition of a tumor can be measured by the concentrations of the primary chromophores, such as oxygenated hemoglobin, deoxygenated hemoglobin, water, and lipid. These chromophores possess distinct signatures in the near infrared window of 600-1100 nm. Therefore, spectral imaging in this window can provide information about the physiological conditions of tumor. Because of high vascularity, breast tumors are known to contain higher level of total hemoglobin concentrations and lower lipid concentration than the surrounding healthy tissue. Various research groups have used spectral imaging based on diffuse optical tomography and spectroscopy techniques to monitor these spectral markers (chromophore concentrations). The studies have demonstrated that the physiological characteristics vary few folds greater in cancerous tumor compared to healthy tissue.

The mechanical properties of a tumor are another subject of interest in non-invasive method. Size and elastic modulus vary significantly in cancerous tumor compared to the healthy tissue. Also, studies demonstrated that the malignant breast tumors are stiffer than surrounding healthy tissue. Based on these mechanical markers, many research groups developed tactile sensors and systems for mechanical imaging of the breast.

Few research groups proposed imaging systems that incorporate both mechanical and spectral imaging modalities. The usage of multi-modal imaging techniques leads to a better characterization of a tumor. However, such systems incur the deficiency of not providing a systematic method for detecting a boundary between a tumor and tissue region. Therefore, tumor size estimation is important since the user needs to determine a value that should be considered as a threshold to determine the boundary. Similar situation prevails in determining depth of the tumor. Another aspect of the existing systems is that the quality of their measurement is affected when the medium surrounding the tumor is too thick or too opaque.

A spectro-mechanical imaging system is highly desirable that will provide a systemic method for tumor boundary detection. Consequently, the systematic method can lead to new ways of size and depth estimation. Furthermore, there is room for improvement in extending the system's capability in case of a deeper tumor.

BRIEF DESCRIPTION OF THE DRAWINGS

Aspects of the present disclosure described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The present disclosure is directed to a system and method for mechanical and spectral characterization of an embedded tumor. Specifically, the present disclosure is directed to a system and method for measuring mechanical properties of a tumor such as size, depth, and stiffness using an inhomogeneity variance guided boundary detection method. The present disclosure is also directed to a system and method for measuring spectral properties of a tumor such as absorption and reduced scattering coefficients under compression.

Figure 1:
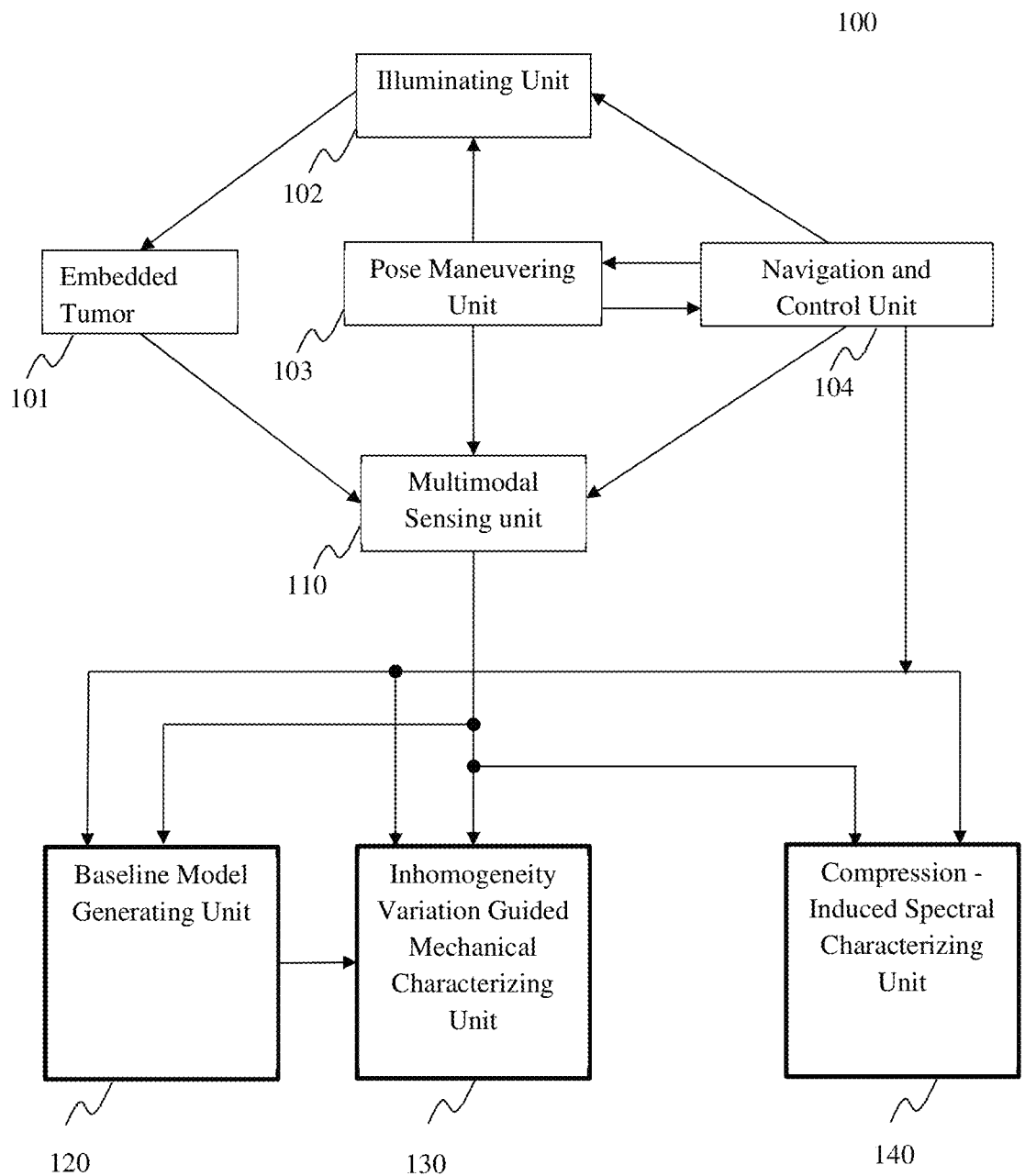
FIG. 1 depicts an exemplary system diagram of a spectro-mechanical imaging (SMI) system.

FIG. 1 shows an exemplary system diagram 100 for spectro-mechanical imaging (SMI) according to an embodiment of the present teaching. The system 100 includes an illuminating unit 102, a pose maneuvering unit 103, a navigation and control unit 104, a multimodal sensing unit 110, a baseline model generating unit 120, an inhomogeneity variation guided mechanical characterizing unit 130, and a compression-induced spectral characterizing unit 140. By way of example, an embedded tumor may be represented by 101.

As stated above, SMI may be performed on one or more tumors, which are embedded inside a larger solid body. The tumor may be opaque and buried under tissue. The surrounding tissue may possess different mechanical and spectral characteristics. The tumor may be biological or artificial. The tumor may be palpable by human hand. The illuminating unit 102 may shine light on the suspected region i.e., a target region where the tumor is present. The multimodal sensing unit 110 is configured to capture the reflected or scattered light from the suspected region. At the same time, the multimodal sensing unit 110 may register a mechanical force applied in the suspected region. The pose of the illuminating unit 102 may be maneuvered by a pose maneuvering unit 103. The pose of an object as defined herein may indicate both position and orientation of the object in a three-dimensional space. The navigation and control unit 104 is configured to control the illuminating unit 102, the pose maneuvering unit 103, and the multimodal sensing unit 110. The navigation and control unit 104 may record the pose of the illuminating and sensing units and the wavelengths used by the illuminating unit 102. The navigation and control unit 104 may maintain the switching among different imaging modes (e.g., spectral imaging mode and/or mechanical imaging mode as described later with reference to FIG. 3) used by the SMI system.

The baseline model generating unit 120 may take inputs from the multimodal sensing unit 110 and the navigation and control unit 104. The baseline model generating unit 120 may generate a baseline model for determining mechanical properties of the tumor. The baseline model generating unit 120 may transmit the baseline model to the inhomogeneity variation guided mechanical characterizing unit 130 (also referred to herein as the mechanical characterizing unit). The mechanical characterizing unit 130 may also receive inputs from the multimodal sensing unit 110 and the navigation and control unit 104. The outputs of the mechanical characterizing unit 130 may be size, depth, and stiffness of the probed tumor. The inputs to the compression-induced spectral characterizing unit 140 may come from the multimodal sensing unit 110 and the navigation and control unit 104. The outputs of the unit 140 may be the chromophore concentrations.

Figure 2:
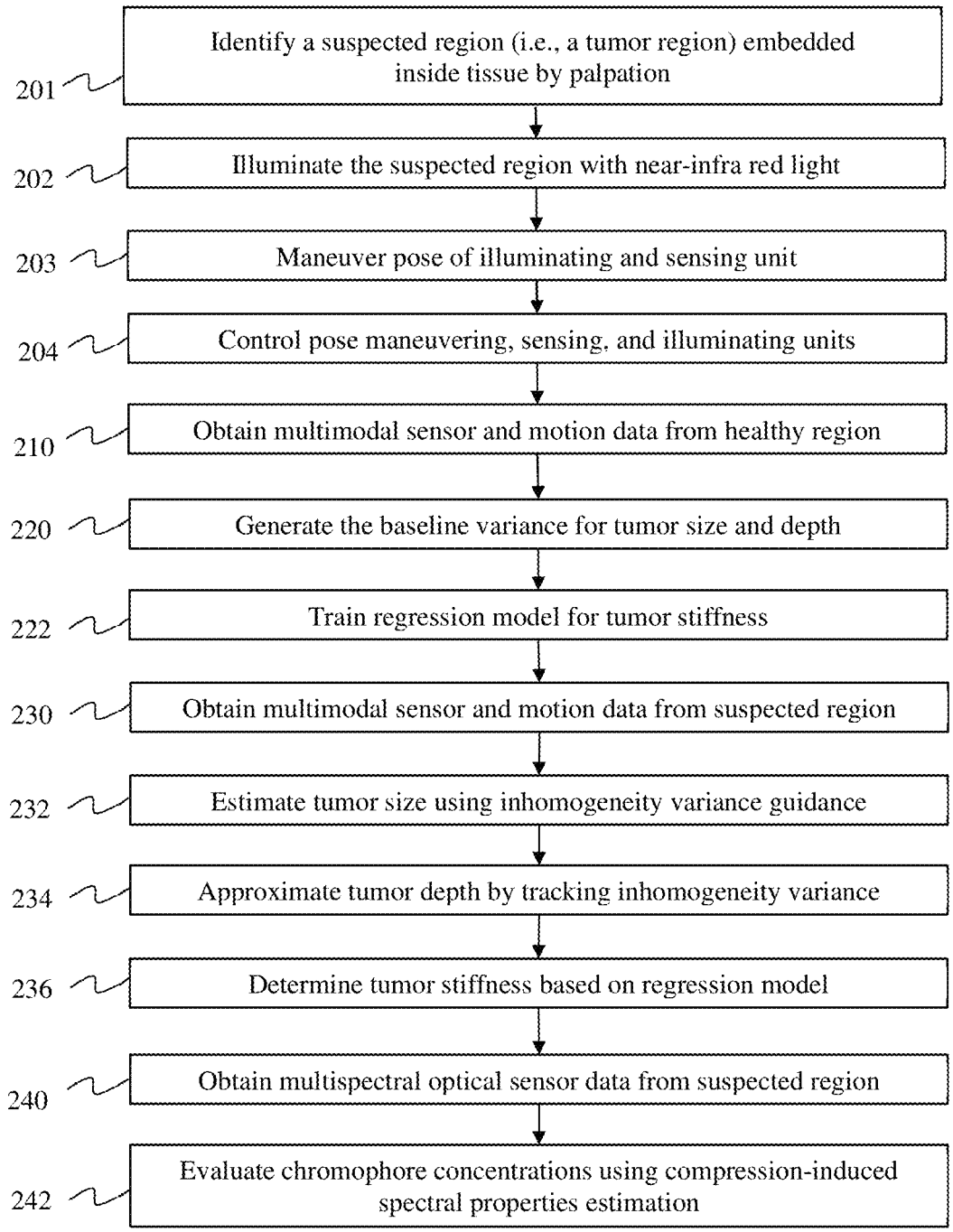
FIG. 2 illustrates an exemplary flow diagram for the SMI system.

FIG. 2 illustrates an exemplary flow diagram for the SMI system, according to one embodiment of the present teaching. At step 201, a region may be palpated by human fingers in search of an embedded tumor. The palpation may let the user know the probable presence of the tumor(s) and help identify a suspected region. At step 202, the suspected region may be lit using near-infrared light. There may be separate illuminating modes for estimating spectral and mechanical properties (described next with reference to FIG. 3). At step 203, the pose maneuvering unit may be used to manipulate the poses of the illuminating and sensing units. At step 204, the control of the pose maneuvering unit may be performed. This step may also comprise the illumination wavelength control, lighting mode switching, and sensing mode switching. At step 210, multimodal sensor and motion data from healthy region may be collected. The multimodal sensor data may be optical data such as images built from the pixels triggered by the reflected or scattered light coming from the tumor. The multimodal sensor data may include the force applied on the suspected region. The motion data may include the pose and velocity of the illuminating unit and the sensing unit during scanning of tumor. The healthy region may not contain any lump or tumor. At step 220, the baseline variance for calculating size and depth of the tumor(s) may be determined. At step 222, a tumor stiffness model (e.g., a regression model) may be determined from artificial phantoms. At step 230, multimodal sensing data and motion data may be obtained from the suspected region. At step 232, the tumor size may be estimated using inhomogeneity variance guidance technique. At step 234, the tumor depth may be approximated by tracking inhomogeneity variance. At step 236, tumor stiffness may be determined using stiffness regression model. At step 240, multispectral optical sensor data from suspected region may be collected. At step 242, compression-induced technique may be used for estimating spectral properties, and eventually to estimate chromophore concentrations.

Figure 3:
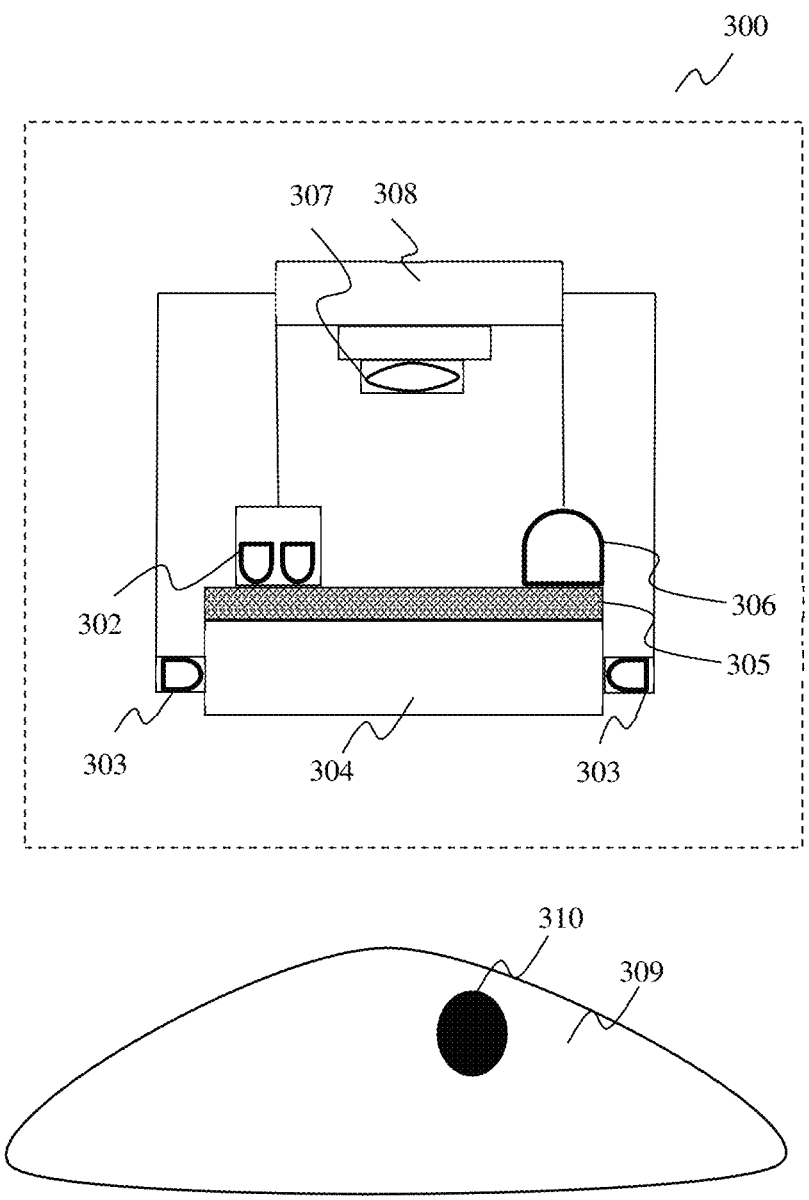
FIG. 3 is an exemplary diagram for assembly of illuminating and multimodal sensing unit.

FIG. 3 is a schematic view of a cross-section of the illuminating unit 102 and the sensing unit 110 (shown inside the dotted rectangle 300). Inside the unit 300, the light emitting diodes or laser diodes 302 may be used for spectral imaging. For mechanical imaging, the light emitting diodes 303 may be used. There may be automatic switching system between these two types of illumination. There may be additional components to control the brightness of the light sources, too.

For spectral imaging, a number of light sources 302 may be used. According to one example, the number of light sources 302 used may be four. Each of these light sources 302 can be of different wavelengths within near infrared range. Different chromophores show distinct characteristics for different wavelengths. Therefore, a combination of wavelengths may need to be determined. One combination may be 650 mm, 720 mm, 870 mm, 910 mm. The appropriate criteria for determining the combination can be found in the literature. The four LEDs or laser diodes 302 may be combined in a proximity in a casing.

For mechanical imaging, the illumination may be performed by LEDs 303. These LEDs may not have specific wavelength criteria. An optical waveguide 304 may be used for guiding light. The waveguide may be made of a transparent elastomer. The elastomer shape may be of cube shape. In such case, the number of LEDs 303 may be four to illuminate the optical waveguide 304 properly. The LEDs 303 may be arranged on a single plane and each pair of LEDs may be in line of sight of one another.

As stated above, the enclosure 300 may contain the multimodal sensing unit. The optical components of the sensing unit may be a lens 307 and a camera 308. The camera 308 should operate with a significant quantum efficiency in the desired spectral window. The desired spectral window may include the wavelengths used in the illuminating unit 102. A force measurement device 306 can be used for estimating the applied compression force. The LEDs/laser diodes 302 and the force measurement device 306 may be placed on a supporting transparent glass plate 305. The glass plate may be on top of the optical waveguide 304. With LEDs 303 on four sides and the supporting glass plate 305, one side of the waveguide is not occupied by anything (i.e., a probing side of the waveguide which will pressed against the suspected region). This side of the optical waveguide 304 may be pressed against a solid medium 309 in which a tumor 310 is embedded. As will become apparent, the enclosure 300 may be optimally designed by re-using the components for different purposes and reducing switching among various stages of sensing to make the SMI system more compact, more convenient to operate, and more economical.

The mechanical image collection procedure may be as follows: the illuminated optical waveguide 304 is pressed on to the surface of the medium 309. The camera is focused on to the glass plate 305. If a tumor is present in the scanning area, the optical waveguide gets deformed, which causes the light to be scattered and hit the detector in the camera 308. As soon as this occurs, a mechanical image with the scattered light may be constructed.

Referring to FIG. 1, the pose maneuvering unit 103 can include a multi-axis linear stage and/or a multi-axis gimbal to provide the necessary motion to the enclosure 300 containing the illuminating unit 102 and the multimodal sensing unit 110. The motion can also be provided with multiple degree-of-freedom robot arm. The pose maneuvering unit 103 can include a geolocation detector or sensor which may comprise an inertial measurement unit, a gyroscope, and an accelerometer.

Figure 4:
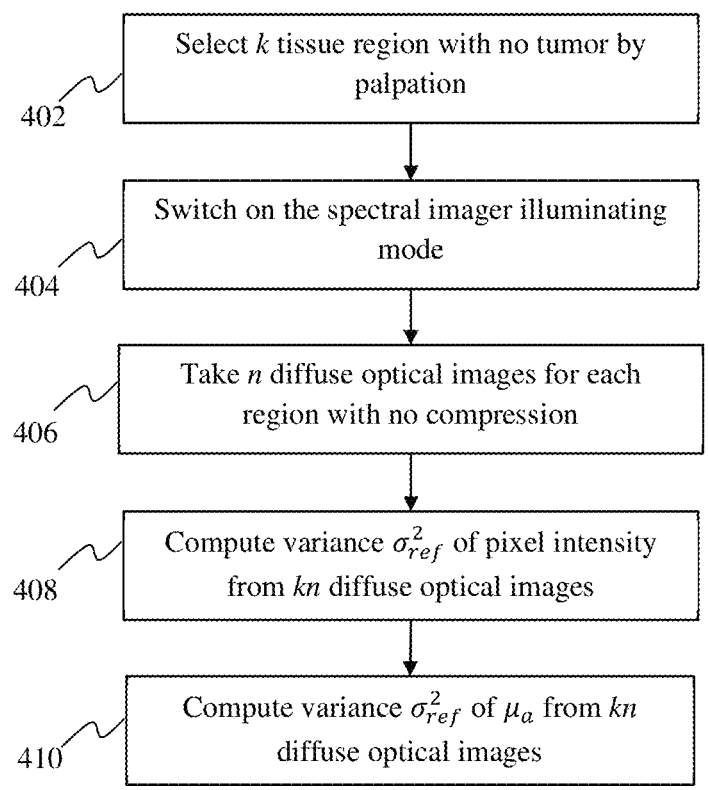
FIG. 4 is an exemplary flow diagram for generating baseline for the mechanical properties.

Referring to FIG. 1, the baseline model generating unit 120 can establish baselines for size and depth estimation and train the stiffness regression model. FIG. 4 illustrates an exemplary flow diagram for baseline generation for size and depth estimation. At step 402, one or more tissue region with no tumor may be identified by human palpation. The tissue region may be discretized. Denote the discretization index by k. At step 404, the spectral imager illuminating mode may be switched on, where LEDs/laser diodes 302 in FIG. 3 can be turned on, and LEDs 303 in FIG. 3 can be turned off. Given that, there are two modes of imaging, one is spectral imaging which utilizes LEDs/laser diodes 302 and the other is mechanical imaging which utilized LEDs 303. Each mode is for obtain different types of information, enabling characterization of different properties of the tumor. Under each mode, a different set of light sources is used to emit lights onto the medium 309 so that scattered lights reflected from the medium can be gathered. When one mode of imaging is turned on, the light sources used in the other mode may be turned off. In some embodiments, the two modes of imaging may be applied in a certain sequence. In some embodiments, the two modes of imaging may be applied alternately.

At step 406, for each k-th region, n number of diffuse optical images can be taken. These images may be pre-processed with existing image enhancement techniques. At step 408, the pixel intensity may be determined from the kn collected images and then the variance may be calculated. The pixel intensity may be determined by summing up the pixel values in the diffuse optical images. The images can be used to determine spectral property of the probed region. The spectral property may be absorption coefficient $\mu_a$. The method of determining absorption coefficient from the diffuse optical measurement is well-known. At step 410, the variance $\sigma^2$ of absorption coefficients from kn diffuse optical measurement can be computed. This value of variance can be considered as the baseline or reference value $\sigma_{ref}^2$. As will become apparent, the baseline may be generated using neural or deep neural network, which may depend on the availability of the large amount of data from multiple subjects.

Figure 5:
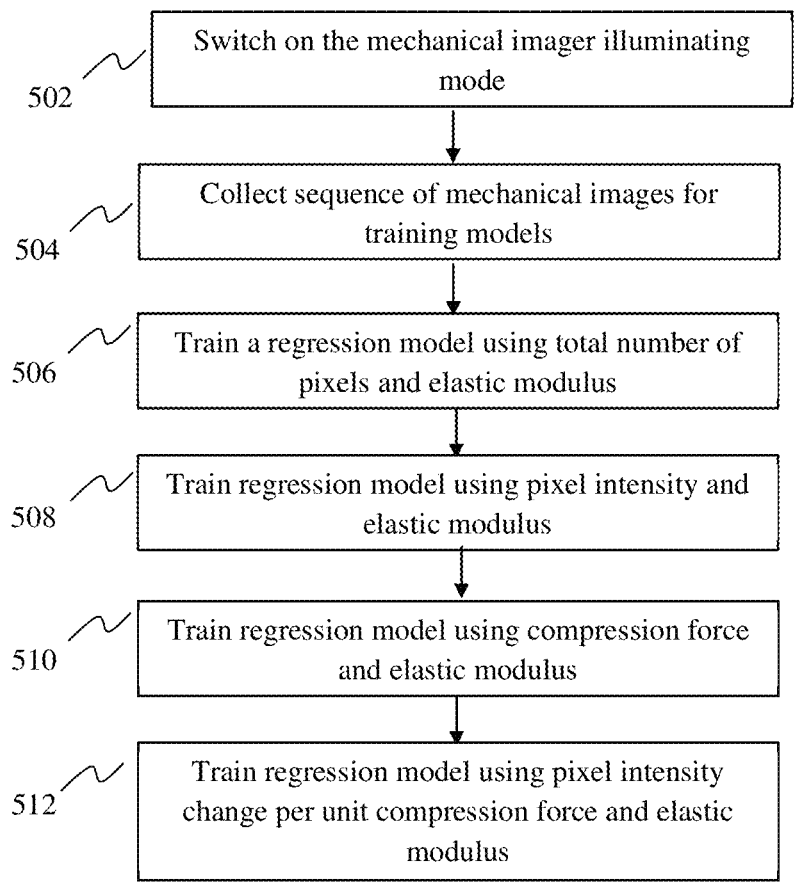
FIG. 5 shows an exemplary workflow of model training for different mechanical characteristics.

FIG. 5 illustrates a workflow for training a tumor stiffness model. At step 502, the mechanical imager illuminating mode may be switched on. In this mode, the LEDs/laser diodes 302 in FIG. 3 can be turned off, and LEDs 303 in FIG. 3 can be turned on. At step 504, a sequence of mechanical images and corresponding compression force value may be collected. For training, an artificial phantom with embedded tumors with known elastic modulus may be used. The artificial tumors may be of different sizes and embedded at different depths of the phantom. At step 506, a regression model may be trained using the number of pixels in the mechanical images and elastic modulus. At step 508, a regression model may be trained using the pixel intensity of the mechanical images and elastic modulus. At step 510, a regression model may be trained using the compression force applied during the mechanical image collection and elastic modulus. At step 512, a regression model may be trained using the pixel intensity change per unit compression force.

Figure 6:
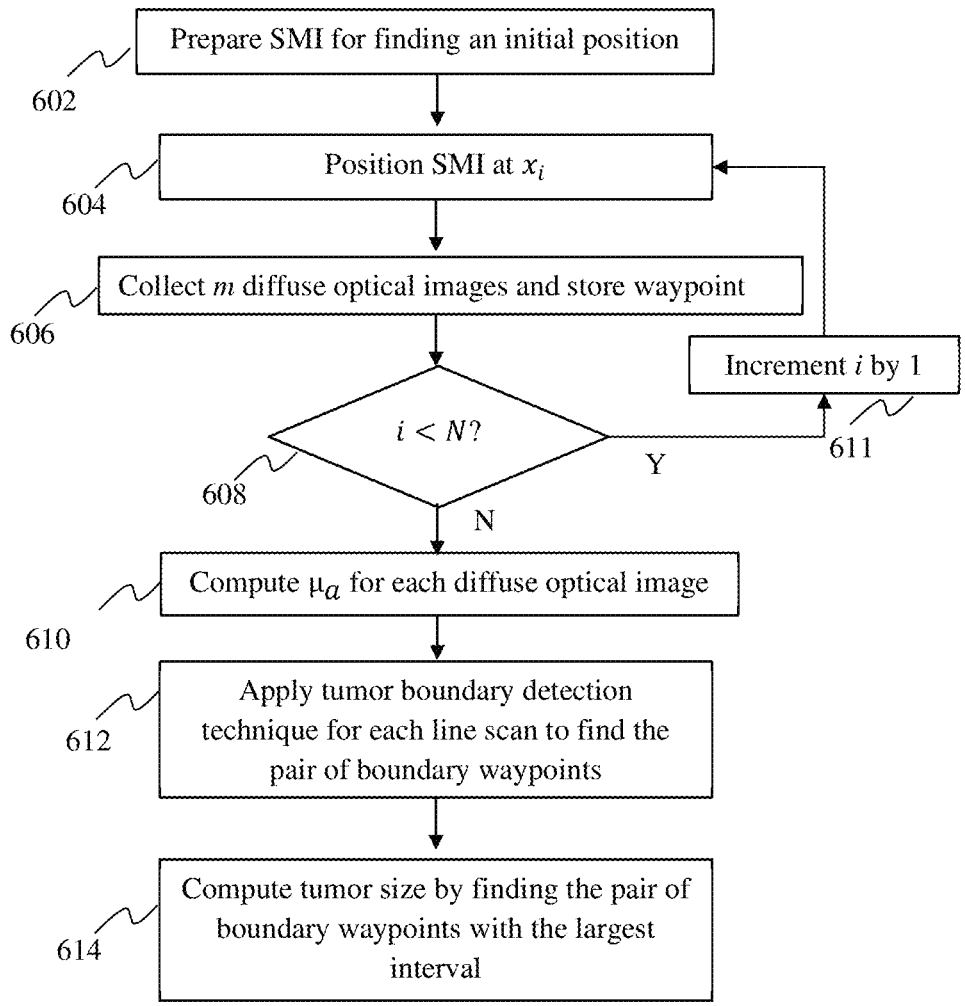
FIG. 6 illustrates an exemplary workflow for determining tumor size.

FIG. 6 illustrates the workflow of the SMI method for size estimation using inhomogeneity variance guidance technique. At step 602, SMI may be prepared for finding an initial position for scanning. The mechanical imager illuminating mode may be switched on. Then the mechanical images may be collected from the suspected area. The compression forces may be recorded, and the number of pixels in the mechanical image per unit compression force can be measured for each location. This pixel per unit force measurement can be compared with a threshold, which can be set by user. With this pixel per unit force measurement, the user decides whether to apply a compression force during SMI size and depth estimation procedure. The compression force can help reduce effective tumor depth from the medium surface, and consequently increase interrogation capability of SMI. In addition, the purpose of applying a mechanical force may be to find out the presence or absence of an embedded tumor. The information on the presence or absence of a tumor may also narrow down the exploration area for spectral imaging. For example, if a tumor is present, pressing the flexible illuminated waveguide will create a deformation in the waveguide. This deformed area's light will be scatter. Based on this scattered light, an image will be reconstructed. If there is no tumor underneath, pressing the waveguide will not create any deformation and eventually no image. A position nearby the first appearance of mechanical image can be considered the initial position for collecting data for SMI size estimation method. Now the spectral imager illuminating mode may be switched on and the camera may be refocused on the plane of the optical waveguide that touches the region of interest. The SMI system is now prepared for collecting diffuse optical images for size estimation.

Referring to FIG. 6, at step 604, the SMI system is positioned at an initial position (also referred to as a waypoint) $x_i$. At step 606, m diffuse optical images may be collected, and waypoint information may be stored. At step 608, the system may check if the terminal waypoint $x_N$ is reached. If not, the index i may be incremented by one at step 611 and the loop may continue to collect a total of mN images from N waypoints. For raster scanning, there may be a nested loop. After travelling through all the specified waypoints, the SMI system may determine absorption coefficient $\mu_a$ for the collected images at step 610. At step 612, tumor boundary detection method may be applied for each line scan to find the boundary waypoints i.e., waypoints that lie on an intersection point of the line scan and a boundary of the tumor. At step 614, the tumor size can be computed by obtaining the pair of boundary waypoints with the largest interval i.e., distance. Steps 612 and 614 will be explained later. It must be noted that the plurality of line scans are parallel to one another. It is to be noted that the scan lines may form rows for estimating tumor size in one direction. The scanning may also be performed in another direction to form columns of scan lines to estimate tumor size in the orthogonal or substantially orthogonal direction with the rows. It may be conceived by one skilled in the related field that the rows and columns can form angles other than 90 to achieve similar size estimation purposes. The final tumor size may be estimated by combining the two tumor sizes obtained in both directions, e.g., by taking the average or the maximum, or the like. Scanning may further be performed in a third or more directions so as to improve the accuracy of size estimation.

Figure 7:
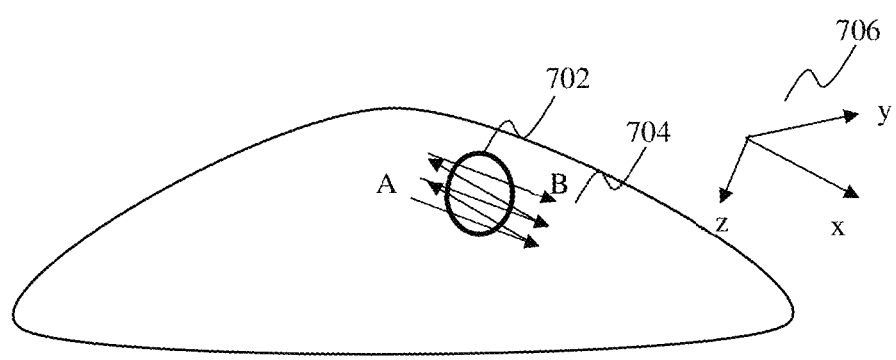
FIG. 7 depicts an example scanning procedure diagram for size estimation.

FIG. 7 illustrates according to one embodiment, an exemplary schematic of the SMI system trajectory during size estimation data collection described in FIG. 6. A three-axis coordinate system 706 is specified to describe the SMI system motion. The SMI motion may follow raster scanning approach starting from A and terminating at B on the surface of the solid medium 704, in which tumor 702 is embedded. The nodes that constitutes the trajectory are referred to herein as waypoints $x_i$, where i=1, 2 . . . , N and N is the number of waypoints.

Figure 8:
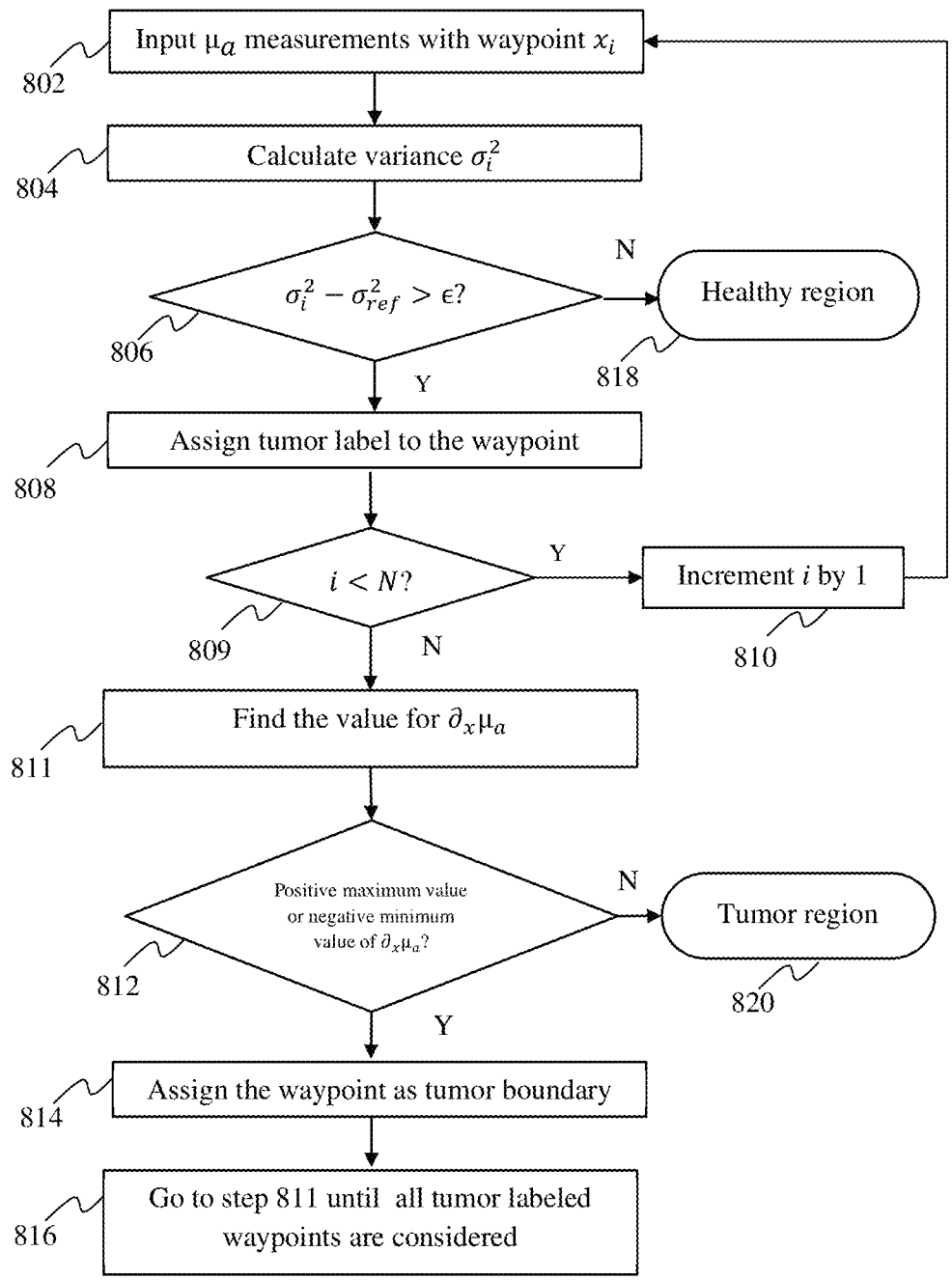
FIG. 8 shows an exemplary flow diagram of inhomogeneity variance guided tumor boundary detection.

FIG. 8 illustrates an exemplary flow of tumor boundary detection for step 612, according to one embodiment of the present teaching. The inputs for the tumor boundary detection method are the absorption coefficients determined from the diffuse optical images collected at waypoints $x=x_i$, i=1, 2, . . . , N. The boundary detection starts at step 802 with the waypoint $x_i$ and the m number of absorption coefficients values $\mu_{a i,j}$, j=1, 2, . . . , m (corresponds to the m images), and parameter i corresponds to the waypoints. At step 804, the variance $\sigma_i^2$ of m absorption coefficients is determined.

At step 806, the variance $\sigma_i^2$ is compared with $\sigma_{ref}^2$ found from the base model generating unit at step 410 of FIG. 4. If $\sigma_i^2 - \sigma_{ref}^2 < \epsilon$, the corresponding waypoint is considered to fall in the healthy region at step 818, where E may be a very small positive value set by the user. This classification is based on the idea as follows.

Human and animal tissue can be considered as turbid medium, which is both diffusive and absorbent. The incident light field is scattered inside a turbid medium, and the light propagates through the medium in a random manner Inhomogeneity inside the turbid medium can elevate this random behavior. One such example of inhomogeneity can be introduced by a tumor embedded under healthy tissue in a solid turbid medium. In this scenario, if a surface of the medium is probed for diffused imaging multiple times, the properties estimated from that surface vary significantly. By way of example, one can say that the absorption coefficients estimated from multiple diffuse optical measurements from the same region have higher variance whenever a tumor is present inside. At the boundary of the tumor, it is expected to demonstrate the largest variation since on one side there is homogeneous region and on the other side there is inhomogeneous region. In the absence of a tumor, the turbid medium is homogeneous, hence, the multiple measurements show a lower level of the variances. Therefore, the variance values from the multiple measurement can be used as a discriminatory factor in deciding a region is healthy or not, which is the core new idea of the present teaching.

If $\sigma_i^2 - \sigma_{ref}^2 > \epsilon$ (step 806) is true, the corresponding waypoint is considered to fall in the tumor region, where E may be a very small positive value set by the user. At step 808, a label may be assigned for the waypoint to identify this as a tumor waypoint. The process the proceeds to step 809 where a query is made to determine whether all waypoints have been considered. Specifically, a query is made to determine whether i<N. If the response to the query is affirmative, the process moves to step 810, wherein the value of the counter i is increased by one. Thereafter, the process loops back to step 802 to process the next waypoint. If the response to the query in step 809 is negative, the process moves to step 811.

The process in steps 811-816 pertains to determining two boundary waypoints i.e., two boundary waypoints which are between tumor and healthy tissue from which a size of the tumor may be estimated. According to an embodiment of the present disclosure, for each line scan (of the raster scanning operation), two boundary points i.e., points on the line that lie on the boundary of the tumor/healthy region may be identified as described below. It must be appreciated that multiple scan lines would result in multiple pairs of such boundary points being determined. The goal is to identify a pair of boundary points which correspond to a diameter of the tumor (e.g., assuming that the tumor has a spherical shape). The identification of two boundary points from which a size of the tumor may be estimated are described next.

For each line scan, the spatial rate of change of absorption coefficient with respect to x-axis may be defined by $$\partial_x \mu_a = \frac{\Delta \mu_a}{\Delta x},$$

where $\Delta \mu_a$ is the difference in absorption coefficient at two waypoints (that is, the difference in absorption coefficient between a waypoint and another waypoint which is closest to the waypoint along x-axis), and $\Delta x$ is the distance between two waypoints along x-axis. At step 811, two waypoints with their absorption coefficient values may be used to determine $\partial_x \mu_a$. At step 812, the value from step 811 may be checked whether this is the positive maximum value or negative minimum value of a, among the tumor labelled waypoint pairs. If the value is not the positive maximum value or negative minimum value, the waypoint may be considered as tumor region and stored at step 820. If the value is the positive maximum value or negative minimum value, then the waypoint may be selected as the boundary point between the tumor and healthy region, from which a size of the tumor may be estimated. It must be appreciated that while computing the rate of change of absorption coefficient of a waypoint with respect to another waypoint, a mean value of the absorption coefficient values (corresponding to images obtained at a waypoint) may be used.

At step 816, the workflow may go back to step 811 until analysis for all the waypoints for all line scans is completed.

After ranking the values of $\partial_x \mu_a$, there should be one largest positive value and one largest negative value. For the largest positive value, the region may be in transition from the homogeneous to the inhomogeneous region. For the largest negative value, the region may be in transition from the inhomogeneous to the homogeneous region. For these two largest values, two boundary waypoints may be found, which is specific to a line scan. Then, the multiple line scans may be performed where each line is parallel to each other. From the difference of these two boundary waypoints tumor size along x-axis can be estimated. Specifically, for each line scan a pair of waypoints that corresponds to the boundary of the tumor are obtained (by step 812). As such distance between these boundary waypoints is obtained. Further, the size of the tumor is estimated by identifying a pair of boundary waypoints corresponding to a particular scan line that have the largest distance (i.e., corresponding to a diameter of the tumor). In the same manner, tumor size can be computed along y-axis. Locating tumor boundary points in x-axis and y-axis may provide information on the shape (circle or ellipse) and size of the tumor.

Figure 9:
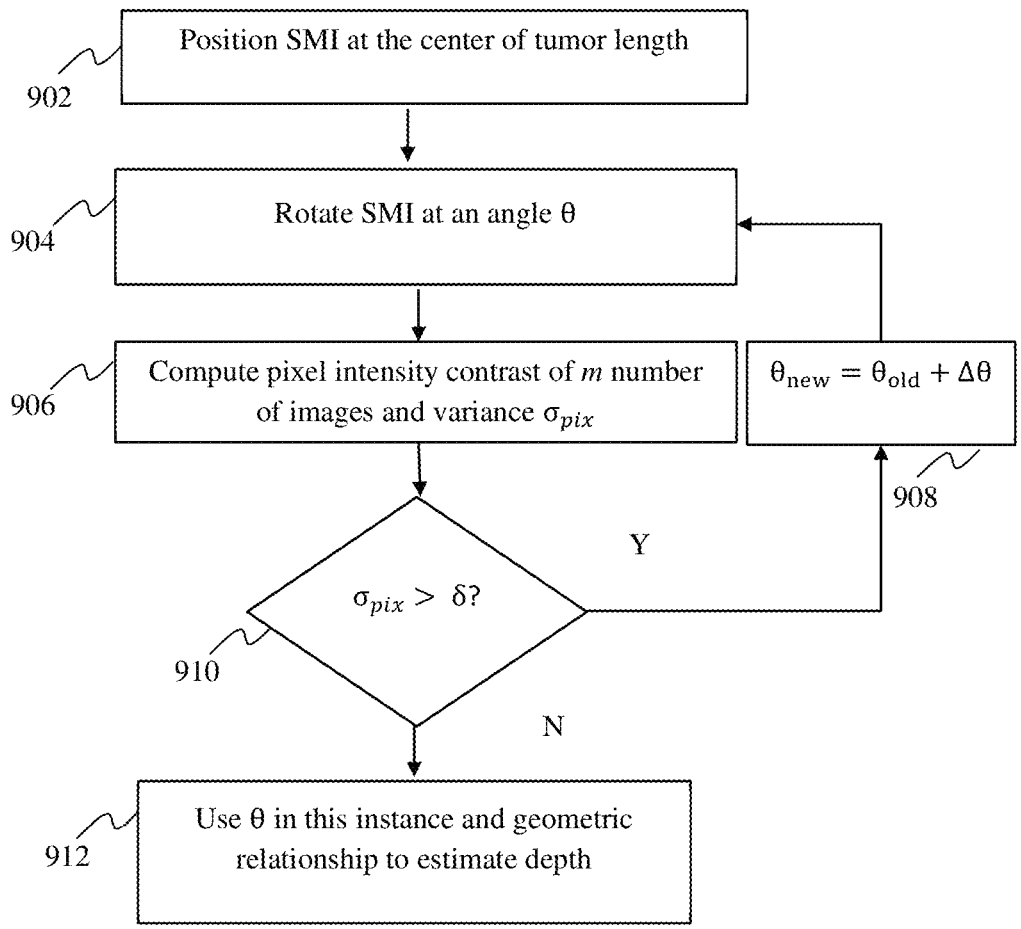
FIG. 9 shows an exemplary flow diagram of tumor depth estimation.

FIG. 9 illustrates the workflow of estimating the depth of the tumor in the medium from the surface based on the SMI method by tracking the inhomogeneity variation. At step 902, the SMI system may be positioned at the center of tumor determined at step 614 of FIG. 6. At step 904 the system may be rotated at angle θ. At step 906, m number of images may be collected, and their pixel intensities may be calculated. Dividing the pixel intensities by the pixel intensity found from a known healthy tissue's region can give the pixel intensity contrast. The variance $\sigma_{pix}$ may be calculated for the m images. At step 910, the variance $\sigma_{pix}$ can be compared with a threshold value δ, which may be set by the user. If $\sigma_{pix}>\delta$, this can indicate the tumor may be in the line of sight of the system, and the angle of rotation may need to be increased. This may take the workflow to step 908 where the angle of rotation is incremented by Δθ, which may be pre-specified by the user. If $\sigma_{pix}<\delta$, this may indicate the tumor may be out of sight of SMI (i.e., referring to FIG. 10, the light ray from the SMI source may be tangential to the tumor) and the SMI method may use 0 in this instance along with geometric relationship to estimate tumor depth.

Figure 10:
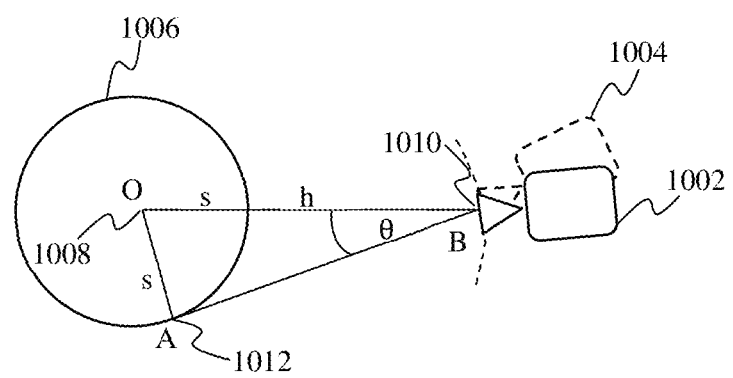
FIG. 10 is an example scanning procedure diagram for estimating depth.

FIG. 10 illustrates the geometric relationship between the poses of SMI and the center of tumor. In FIG. 10, the tumor is indicated by 1006, and the initial and final poses of SMI are indicated by 1002 and 1004. The tumor is assumed to be spherical. Therefore, the cross-section is a circle. The center O of tumor 1006 is denoted by 1008, and the intersection point B, between the initial pose 1002 and the final pose 1004 of SMI, is denoted by 1010. A surface point A on the tumor is denoted by 1012. Three points O (1008), B (1010), and A (1012) may create a triangle OAB. Denote the tumor size by s, and the tumor depth from the medium surface to the tumor surface by h, where the size s may be determined from step 614 of FIG. 6. The angle θ between OB and AB may be determined from step 912 of FIG. 9. The tumor depth, h, may be determined by the following formula:

$h=s(\cot \theta -1)$.

Figure 11:
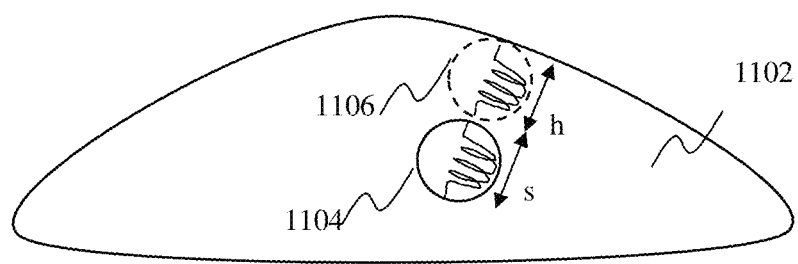
FIG. 11 illustrates an example effective elastic modulus model for embedded tumor inside a tissue medium.

The stiffness of tumor is correlated with the malignancy of tumor, therefore, is another subject of interest in the present disclosure. The stiffness of an object can be described by elastic modulus. The elastic modulus of tumor may not be directly measured with SMI when the tumor is embedded into a solid medium. SMI may estimate an effective elastic modulus. A schematic is presented in FIG. 11 with which the relationship between the effective elastic modulus and the elastic modulus of tumor and surrounding tissue can be described. A tumor 1104 of size s is embedded into a solid medium 1102 at a depth of h. Because of elasticity the tumor 1104 may be viewed as a spring of spring constant $k_{tumor}$. Similarly, the tissue from the medium surface to tumor surface may be also viewed as a spring of spring constant $k_{tissue}$. If the two springs are connected as series combination, an effective spring with spring constant $k_{eff}$ can be determined. Using Hooke's Law, from FIG. 11, the relationship between tumor size, depth, and elastic modulus can be written as follows:

$$\frac{1}{Y_{eff}}\frac{s+h}{A} = \frac{1}{k_{eff}} = \frac{1}{Y_{tissue}}\frac{h}{A} + \frac{1}{Y_{tumor}}\frac{s}{A}$$

Where parameter A corresponds to a cross-sectional area of the tumor. The above equation can be rearranged to:

$$Y_{tumor} = \frac{Y_{eff}Y_{tissue}s}{(s+h)Y_{tissue} - hY_{eff}},$$

where $Y_{eff}$, s, h can be estimated using the SMI method, and $Y_{tissue}$ can be estimated using standard elastic modulus measuring device.

Figure 12:
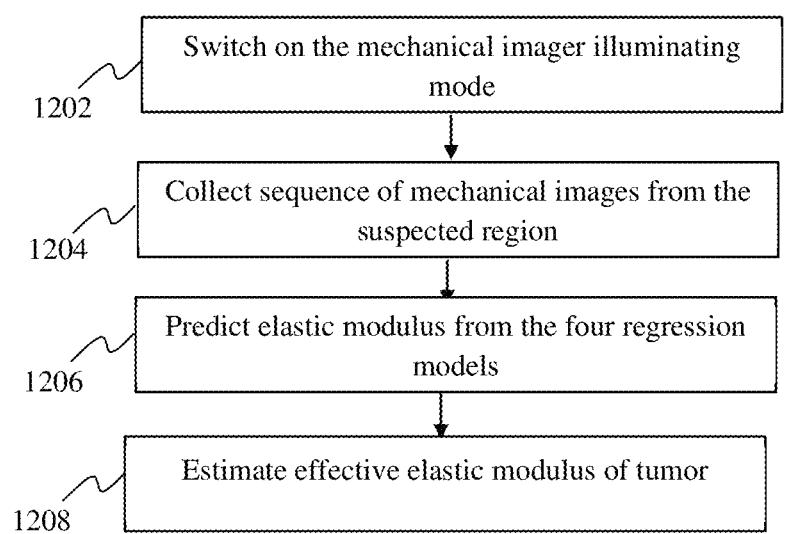
FIG. 12 is an exemplary flow diagram for measuring effective elastic modulus.

FIG. 12 illustrates a workflow for estimating effective elastic modulus of the embedded tumor inside a solid medium using the SMI method. At step 1202, the mechanical imager illuminating mode may be switched on. At step 1204, a sequence of mechanical images may be collected from the suspected region. At step 1206, elastic moduli may be predicted from four models that are generated using the workflow in FIG. 5. At step 1208, the effective elastic modulus of tumor may be determined as a linear combination of the four predicted values.

As stated above in FIG. 2, the compression-induced spectral properties estimation technique may be performed to estimate chromophore concentrations at step 242. Conventionally, no significant pressure may be applied on the suspected region during spectral imager illuminating mode and diffuse optical image collection. In the present teaching, the optical waveguide in the multimodal sensing unit may be built using flexible elastomer. Because of this flexibility, the waveguide may be pressed against the suspected region. This compression induced action may reduce the effective depth of tumor from surface and may enable the compression-induced spectral properties estimating unit 140 to calculate the chromophore concentrations of the tumor which may be located deeper into the tissue. The conventional chromophore concentration determination formula may be used which is well established in the literature.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 13:
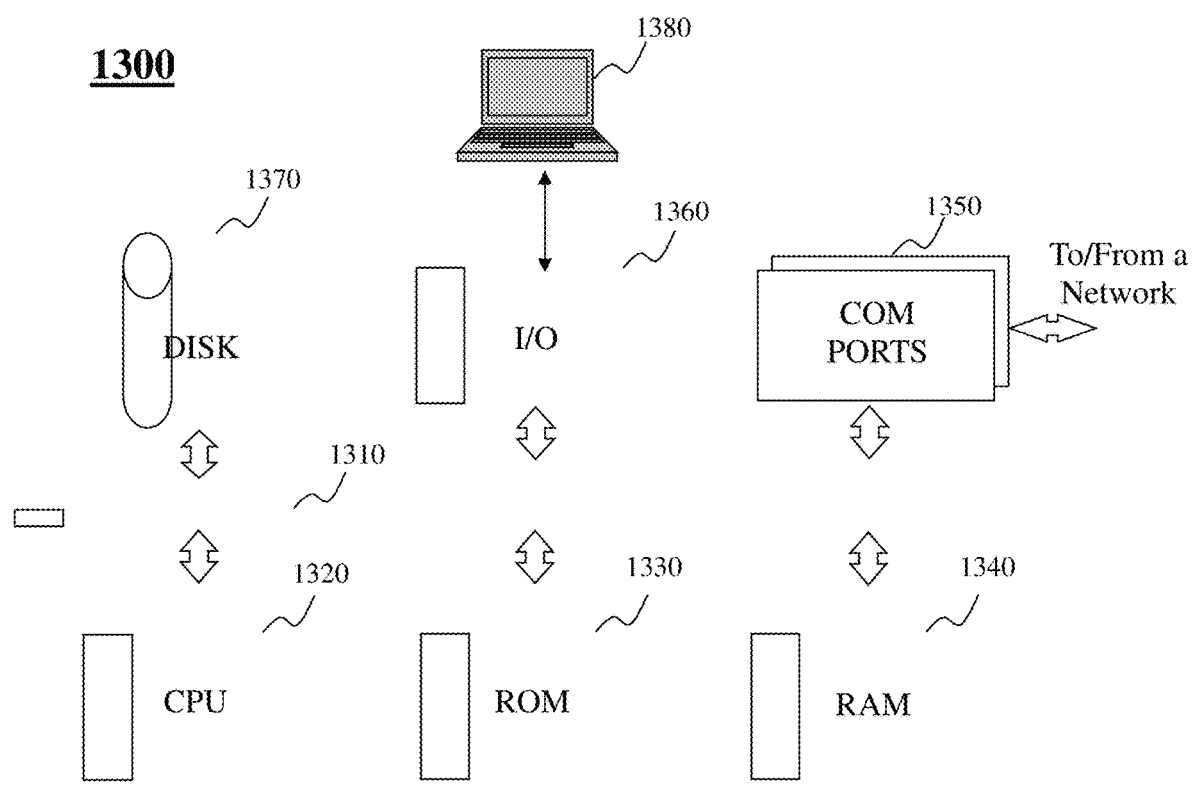
FIG. 13 depicts the architecture of a computer which can be used to implement a specialized system incorporating the present teaching.

FIG. 13 is an illustrative diagram of an exemplary computer system architecture, in accordance with various embodiments of the present teaching. Such a specialized system incorporating the present teaching has a functional block diagram illustration of a hardware platform which includes user interface elements. Computer 1300 may be a general-purpose computer or a special purpose computer. Both can be used to implement a specialized system for the present teaching. Computer 1300 may be used to implement any component(s) described herein. For example, the present teaching may be implemented on a computer such as computer 1300 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1300, for example, may include communication ports 1350 connected to and from a network connected thereto to facilitate data communications. Computer 1300 also includes a central processing unit (CPU) 1320, in the form of one or more processors, for executing program instructions. The exemplary computer platform may also include an internal communication bus 1310, program storage and data storage of different forms (e.g., disk 1370, read only memory (ROM) 1330, or random access memory (RAM) 1340), for various data files to be processed and/or communicated by computer 1300, as well as possibly program instructions to be executed by CPU 1320. Computer 1300 may also include an I/O component 1360 supporting input/output flows between the computer and other components therein such as user interface elements 1380. Computer 1300 may also receive programming and data via network communications.

Hence, aspects of the present teaching(s) as outlined above, may be embodied in programming Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the spectro-mechanical imaging system into the hardware platform(s) of a computing environment or other system implementing a computing environment or similar functionalities in connection with characterizing the target. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method, implemented on a machine having at least one processor, storage, and a communication platform, capable of connecting to a network for characterizing a tumor inside a human body, the method comprising:
    collecting, via a first imaging mode, a first set of information to be used at least for identifying a region in the human body where the tumor resides, the first imaging mode comprising spectral imaging;
    collecting, via a second imaging mode, a second set of information from the region, the second imaging mode comprising mechanical imaging;
    training a first regression model based on a number of pixels in at least one mechanical image captured during the mechanical imaging;
    training a second regression model using compression force measured during the mechanical imaging;
    training a third regression model using a pixel intensity of images captured during the mechanical imaging; and
    training a fourth regression model using a change of the pixel intensity per unit of the compression force,
    wherein the tumor is characterized in terms of its mechanical and spectral properties estimated based on the first and second sets of information and further based on an integration of outputs of the first regression model, the second regression model, the third regression model, and the fourth regression model.

2. The method of claim 1, wherein when the second imaging mode is activated, the first imaging mode is deactivated.

3. The method of claim 1, wherein
    mechanical properties of the tumor measured during the mechanical imaging include at least one of a size, a depth, and stiffness of the tumor; and
    spectral properties of the tumor measured during the spectral imaging include at least chromophore concentrations of the tumor.

4. The method of claim 3, wherein the stiffness of the tumor is measured based on an elastic modulus of the tumor.

5. The method of claim 1, wherein during the first imaging mode, when a waveguide of the machine is pressed onto a surface of the human body, the method further comprises:
    emitting light onto the surface of the human body by a first plurality of light emitting diodes (LEDs);

measuring a first imaging mode compression force applied in pressing the waveguide onto the surface;

measuring, by a sensor operating in a predetermined spectral window, scattered light detected in a scanning area when the waveguide is deformed; and outputting a mechanical image constructed based on the scattered light and the first imaging mode compression force, the mechanical image corresponding to the tumor.

6. The method of claim 5, wherein the waveguide is deformed when the tumor is present in the human body near the scanning area.

7. The method of claim 5, wherein during the second imaging mode, the method further comprises:

emitting light onto the surface of the human body by a second plurality of LEDs at one or more of time instances;

at each of the one or more time instances,
measuring, by the sensor, scattered light from the human body detected in a scanning area,
creating a diffuse optical image based on the scattered light as measured;

generating an intensity image based on one or more diffuse optical images at the one or more time instances;

determining spectral properties associated with the intensity image; and outputting the spectral properties.

8. The method of claim 7, further comprising characterizing the tumor based on a baseline model by:

estimating stiffness of the tumor based on the first imaging mode compression force in accordance with a stiffness model;

estimating a size of the tumor based on inhomogeneity variance of an absorption coefficient across the intensity image;

estimating a depth of the tumor based on inhomogeneity variance of pixel intensity across the intensity image; and estimating tumor chromophore concentrations based on first imaging mode compression-induced spectral imaging.

9. The method of claim 8, wherein the baseline model is generated using:

at least one of reflected or scattered light within the region;

a mechanical force applied in the region;

a pose of an illuminating device, the illuminating device comprising at least one of the first plurality of LEDs, the second plurality of LEDs, or a laser diode; and a pose of the sensor.

10. An apparatus for characterizing a tumor inside a human body, comprising:

a waveguide having a first side and a second side, wherein the second side serves as a probing side through which the apparatus is operated to press against a surface of the human body;

a glass plate having a top side and a bottom side, wherein the bottom side interfaces with the first side of the waveguide;

a first plurality of light emitting diodes (LEDs) arranged along a plurality sides of the waveguide, the first plurality of LEDs configured to perform spectral imaging;

a second plurality of LEDs residing on the top side of the glass plate, the second plurality of LEDs configured to perform mechanical imaging;

a multimodal sensing unit provided with a focus directed to a scanning area of the glass plate and operating in a predetermined spectral window,
wherein a first regression model is trained based on a number of pixels in at least one mechanical image captured during the mechanical imaging;
wherein a second regression model is trained using compression force measured during the mechanical imaging;
wherein a third regression model is trained using a pixel intensity of images captured during the mechanical imaging;
wherein a fourth regression model is trained using a change of the pixel intensity per unit of the compression force; and
wherein the tumor is characterized in terms of its mechanical and spectral properties estimated based on the mechanical imaging, the spectral imaging, and further based on an integration of outputs of the first regression model, the second regression model, the third regression model, and the fourth regression model;

at least one processor; and a non-transitory computer-readable storage medium having instructions stored therein which, when executed by the at least one processor, cause the at least one processor to perform operations comprising:

measuring a mechanical force applied by the first side of the waveguide.

11. The apparatus of claim 10, wherein the apparatus is operated for characterizing the tumor by utilizing components included therein to form;

a first imaging unit comprising:
the waveguide, the glass plate, the first plurality of LEDs, and the multimodal sensing unit; and a second imaging unit comprising:
the waveguide, the glass plate, the second plurality of LEDs, and the multimodal sensing unit.

12. The apparatus of claim 11, wherein the apparatus is controlled to activate the first imaging unit to enter into a first imaging mode to collect a first set of information to be used at least for identifying a region in the human body where the tumor resides;

activate the second imaging unit to enter into a second imaging mode to collect a second set of information from the region, wherein the tumor is characterized in terms of its mechanical and spectral properties estimated based on the first and second sets of information.

13. The apparatus of claim 12, wherein when the second imaging mode is activated, the first imaging mode is deactivated.

14. The apparatus of claim 12, wherein mechanical properties of the tumor measured during the mechanical imaging include at least one of a size, a depth, and stiffness of the tumor; and spectral properties of the tumor measured during the spectral imaging include at least chromophore concentrations of the tumor.

15. The apparatus of claim 14, wherein the stiffness of the tumor is measured based on an elastic modulus of the tumor.

16. The apparatus of claim 12, wherein during the first imaging mode, when a waveguide of the apparatus is pressed onto a surface of the human body, the first plurality of LEDs are turned on to emit light to the human body;

a first compression force is applied in pressing probing side of the waveguide onto the surface;
the multimodal sensing unit is configured to;
measure scattered light observed in the scanning area of the glass plate when the waveguide is deformed, and output a mechanical image constructed based on the scattered light and the first compression force.

17. The apparatus of claim 16, wherein the waveguide is deformed when the tumor is present in the human body corresponding to the scanning area of the glass plate.

18. The apparatus of claim 16, wherein during the second imaging mode,
the second plurality of LEDs are turned on to emit light to the human body;
the multimodal sensing unit is configured to, at each of a plurality of time instances,
measure scattered light from the human body,
create a diffuse optical image based on the measured scattered light, and
generate an intensity image based on a plurality of diffuse optical images corresponding to the plurality of time instances.

19. The apparatus of claim 18, the non-transitory computer-readable storage medium having additional instructions stored which, when executed by the at least one processor, to perform operations comprising
characterizing the tumor in terms of its mechanical properties including at least one of a size, a depth, and stiffness; and
characterizing the tumor in terms of tumor chromophore concentrations.

20. The apparatus of claim 19, the non-transitory computer-readable storage medium having additional instructions stored which, when executed by the at least one processor, to perform operations comprising:
estimating:
the stiffness of the tumor based on the first compression force in accordance with a stiffness model;
the size of the tumor based on inhomogeneity variance of an absorption coefficient across the intensity image
the depth of the tumor based on inhomogeneity variance of pixel intensity across the intensity image; and the tumor chromophore concentrations based on compression-induced spectral imaging.

21. A non-transitory computer-readable storage medium having data recorded thereon for characterizing a tumor inside a human body, and further having instructions stored thereon which, when read by a machine, causes the machine to perform operations comprising:
collecting, via a first imaging mode, a first set of information to be used at least for identifying a region in the human body where the tumor resides, the first imaging mode comprising spectral imaging;
collecting, via a second imaging mode, a second set of information from the region, the second imaging mode comprising mechanical imaging;
training a first regression model based on a number of pixels in at least one mechanical image captured during the mechanical imaging;
training a second regression model using compression force measured during the mechanical imaging;
training a third regression model using a pixel intensity of images captured during the mechanical imaging; and
training a fourth regression model using a change of the pixel intensity per unit of the compression force,
wherein the tumor is characterized in terms of its mechanical and spectral properties estimated based on the first and second sets of information and further based on an integration of outputs of the first regression model, the second regression model, the third regression model, and the fourth regression model.

22. The non-transitory computer-readable storage medium of claim 21, wherein when the second imaging mode is activated, the first imaging mode is deactivated.

23. The non-transitory computer-readable storage medium of claim 21, wherein
mechanical properties of the tumor measured during the mechanical imaging include at least one of a size, a depth, and stiffness of the tumor; and
spectral properties of the tumor measured during the spectral imaging include at least chromophore concentrations of the tumor.

24. The non-transitory computer-readable storage medium of claim 23, wherein the stiffness of the tumor is measured based on an elastic modulus of the tumor.

25. The non-transitory computer-readable storage medium of claim 21, wherein during the first imaging mode, when a waveguide of the machine is pressed onto a surface of the human body,
emitting light onto the surface of the human body by a first plurality of light emitting diodes (LEDs);
measuring a first compression force applied in pressing the waveguide onto the surface;
measuring, by a sensor operating in a predetermined spectral window, scattered light detected in a scanning area when the waveguide is deformed;
outputting a mechanical image constructed based on the scattered light and the first compression force.

26. The non-transitory computer-readable storage medium of claim 25, wherein the waveguide is deformed when the tumor is present in the human body near the scanning area.

27. The non-transitory computer-readable storage medium of claim 25, wherein during the second imaging mode,
emitting light onto the surface of the human body by a second plurality of LEDs at one or more of time instances;
at each of the one or more time instances,
measuring, by the sensor, scattered light from the human body detected in a scanning area,
creating a diffuse optical image based on the scattered light as measured;
generating an intensity image based on one or more diffuse optical images at the one or more time instances;
determining spectral properties associated with the intensity image; and
outputting the spectral properties.

28. The non-transitory computer-readable storage medium of claim 27, further comprising characterizing the tumor based on a baseline model by:
estimating stiffness of the tumor based on the first compression force in accordance with a stiffness model;
estimating a size of the tumor based on inhomogeneity variance of an absorption coefficient across the intensity image;
estimating a depth of the tumor based on inhomogeneity variance of pixel intensity across the intensity image; and
estimating tumor chromophore concentrations based on compression-induced spectral imaging.

29. The non-transitory computer-readable storage medium of claim 28, wherein the baseline model is generated using:
- at least one of reflected or scattered light within the region;
- a mechanical force applied in the region;
- a pose of an illuminating device, the illuminating device comprising at least one of the first plurality of LEDs, the second plurality of LEDs, or a laser diode; and
- a pose of the sensor.

* * * * *